Oct. 20, 1942.  M. UREMOVICH  2,299,262
POWER-DRIVEN BENCH SAW
Filed April 29, 1940  5 Sheets—Sheet 1

Inventor
M. Uremovich
By
Attorneys

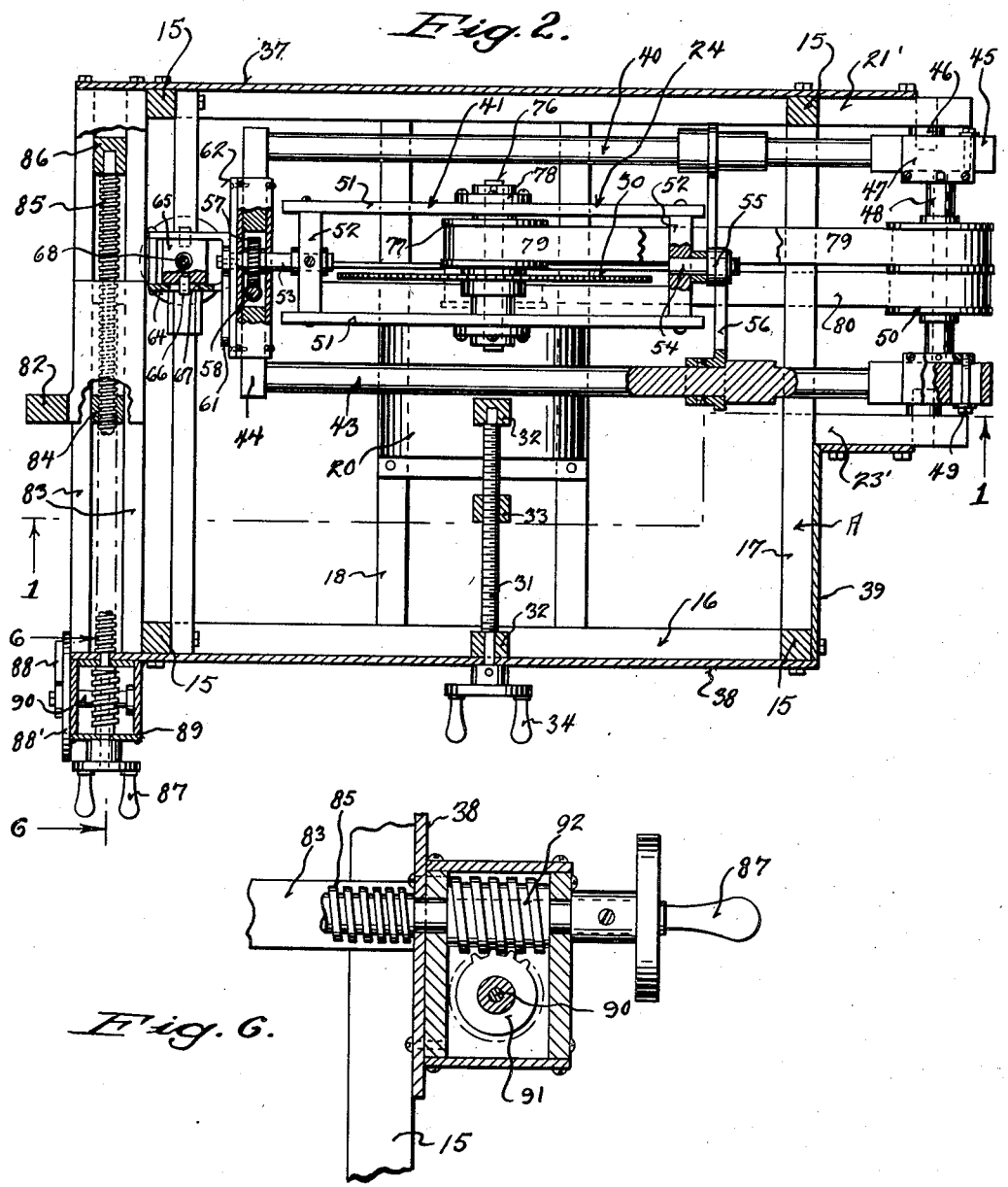

Oct. 20, 1942.  M. UREMOVICH  2,299,262
POWER-DRIVEN BENCH SAW
Filed April 29, 1940  5 Sheets-Sheet 3
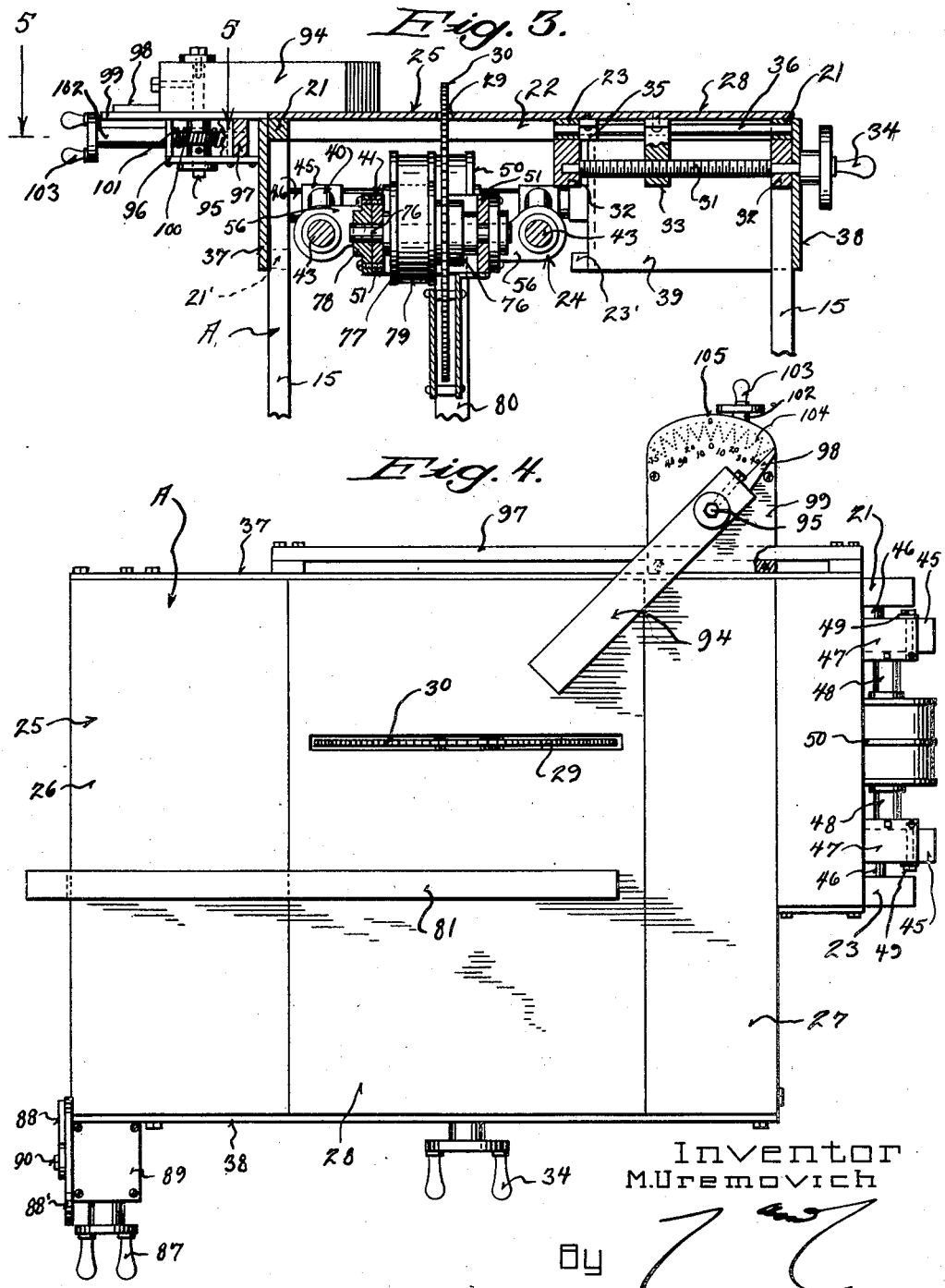
Inventor
M. Uremovich
By
Attorneys Oct. 20, 1942.        M. UREMOVICH         2,299,262
POWER-DRIVEN BENCH SAW
Filed April 29, 1940         5 Sheets-Sheet 4

Inventor
M. Uremovich
By
Attorneys

Oct. 20, 1942.   M. UREMOVICH   2,299,262
POWER-DRIVEN BENCH SAW
Filed April 29, 1940   5 Sheets-Sheet 5

Inventor
M. Uremovich
By
Attorneys

Patented Oct. 20, 1942

2,299,262

UNITED STATES PATENT OFFICE 2,299,262

POWER-DRIVEN BENCH SAW

Mark Uremovich, Milwaukee, Wis.

Application April 29, 1940, Serial No. 332,317

3 Claims. (Cl. 143—36)

This invention appertains to power-driven tools, and more particularly to a rotary bench saw.

One of the primary objects of my invention is the provision of a stationary saw table having a hingedly mounted frame thereon disposed below the table top, carrying a rotatable saw blade for projection through a slot in the table, with novel means including a dial and pointer for accurately adjusting the frame and saw blade up and down for positioning the saw blade the desired height above the table top, whereby a saw cut of the correct depth can be made.

Another salient object of my invention is to provide a secondary frame hingedly mounted on and movable at right angles to the primary saw frame and rotatably supporting the saw blade, with means for accurately adjusting and swinging the secondary frame and saw blade, so that the saw blade can be tilted at any preferred angle to make desired angular cuts in the work.

Another important object of my invention is to provide a sliding table top section through which the saw blade projects, with means for moving said section across the table top, whereby said sliding section can be properly disposed with its slot during the angular adjustment of the saw blade.

A further object of my invention is to provide novel adjustable gauges and slide blocks on the table for the work, whereby the work can be accurately positioned and manipulated relative to the saw, so that the desired and preferred cuts can be rapidly and accurately brought about.

A further important object of my invention is the provision of novel means for arranging the graduations on the various dial plates, so that the position of the pointers relative to the graduations can be readily read and thereby permit the accurate setting of the saw blade, gauges, and the like.

A still further important object of my invention is to provide a power-driven bench saw of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 2 is a horizontal, sectional view through my power-driven saw, taken on the line 2—2 of Figure 1, looking in the direction of the arrows, and illustrating the swinging frame for the saw in top plan, the view also illustrating the mechanism for adjusting the longitudinal gauge block for the work.

Figure 3 is a fragmentary, transverse, sectional view through the sawing device, taken on the line 3—3 of Figure 1, looking in the direction of the arrows, the view illustrating the mechanism for operating the sliding table top section.

Figure 4 is a top plan view of my novel power-driven bench saw.

Figure 6 is a fragmentary, transverse, sectional view taken on the line 6—6 of Figure 2, looking in the direction of the arrows, illustrating a part of the mechanism employed for sliding the longitudinal gauge block for the work across the saw table.

Figure 1:
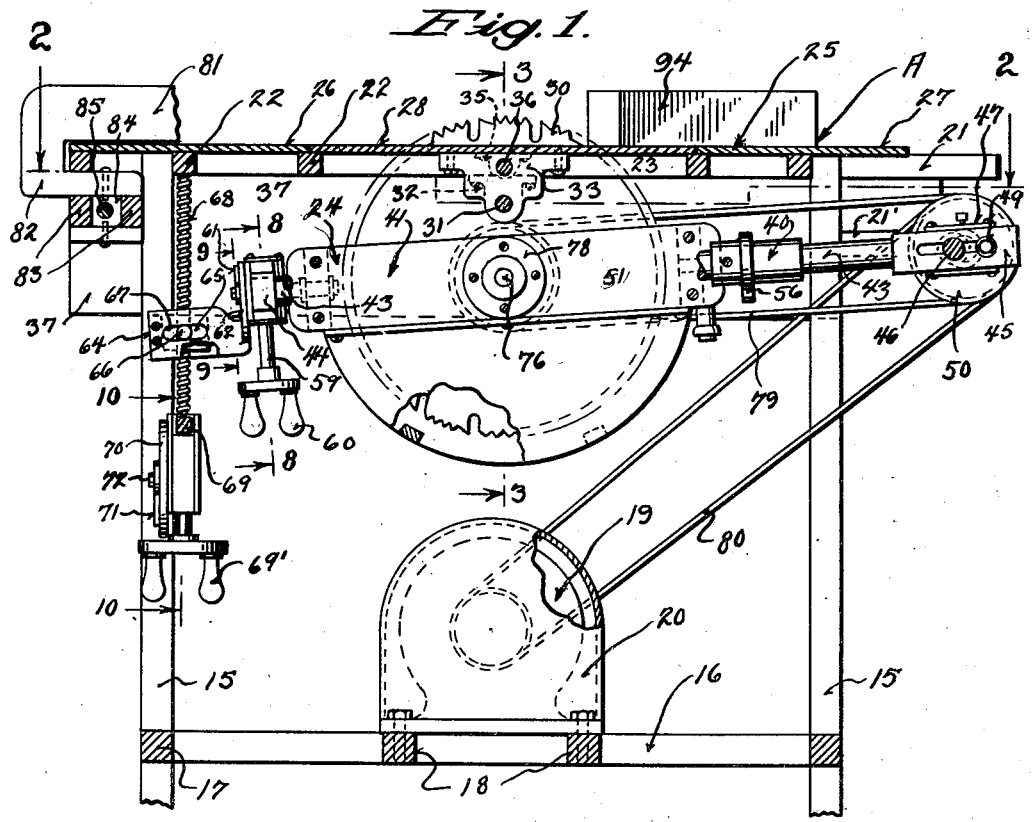
Figure 1 is a longitudinal, sectional view through my bench saw, taken on the line 1—1 of Figure 2, looking in the direction of the arrows, and illustrating the construction of the swinging saw frame and the adjusting mechanism therefor.
Figure 5:
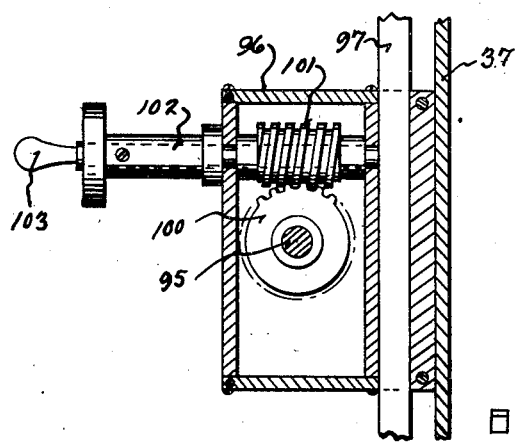
Figure 5 is a detail, horizontal, sectional view taken on the line 5—5 of Figure 3, looking in the direction of the arrows, illustrating a part of the mechanism employed for changing the angle of the transverse gauge block for the work.

Referring to the drawings in detail, wherein similar reference characters designate corresponding parts throughout the several views, the letter A generally indicates my improved power-driven bench saw, and the same includes a rigid frame, which may consist of corner standards or legs 15. The legs are connected adjacent their lower ends by longitudinal bottom rails 16 and transverse bottom rails 17. The longitudinal bottom rail 16 can also be further connected by intermediate, transverse rails 18, and these rails can act as a bed for an electric drive motor 19 when a motor is connected with the bench. Where the motor is connected with or forms a part of the bench, the same preferably is enclosed by a protecting housing 20, so that the operation thereof will not be hindered by falling sawdust.

The upper terminals of the corner legs 15 are connected by longitudinally extending top rails 21, and these rails are connected by a series of transversely extending top rails 22. An intermediate longitudinally extending rail 23 is secured to the transverse rails 22 in spaced parallel relation to the longitudinal top rails 21, and it is to be noted that one longitudinal top rail 21 and the intermediate top rail 23 project beyond one end of the frame to form supports for the swinging saw-carrying mechanism 24, which will be hereinafter more fully described.

Carried by the upper end of the frame is the table top 25, and this table top is formed level and smooth for receiving the work. The table top 25 includes two stationary, spaced table top sections 26 and 27, which extend transversely across the frame, and these rigid table top sections 26 and 27 are rigidly connected to the adjacent longitudinal top rails 21 and 23, and the transverse rails 22.

Slidably mounted on the upper face of the longitudinal rails 21 and 23 and on certain of the transverse rails 22 is the movable table top section 28. This table top section 28 is provided with a slot 29, through which the rotary disc saw blade 30 is adapted to project. The table top section 28 is movable back and forth transversely of the table by means of a feed screw 31. This feed screw 31 is rotatably mounted in bearing blocks 32 carried by one longitudinal top rail 21 and the intermediate longitudinal rail 23.

Rigidly fastened to the lower face of the sliding table top section 28 is a feed nut 33, which receives the feed screw 31. The outer end of the screw shaft 31 has fastened thereto any preferred type of manipulating handles or cranks 34. Obviously, by turning the handles or crank wheel 34, the table top section 28 can be slid back and forth. This is necessary, so that when the angle of the saw blade 30 is changed, the table top section 28 can move and change the position of the saw slot 29 in accordance with the change in the angular position of the saw blade.

In order to aid in the guiding of the table top section 28 back and forth, the lower face of the table top section 28 has fastened thereto a guide sleeve or similar member 35, and this guide sleeve is slidably mounted on a guide rod 36 carried by one longitudinal top rail 21 and the intermediate top rail 23.

The frame can also be braced in any other preferred way, and I preferably provide side protecting steel plates 37 and 38 and an end protecting steel plate 39.

Now, referring more specifically to the saw blade-supporting mechanism 24, it can be seen that the same includes an outer main or primary frame 40 and an inner swinging secondary frame 41. The main or primary frame 40 includes spaced, parallel, longitudinally extending bars 43 connected at their front ends by a crosspiece 44. The rear ends of the bars 43 have formed thereon or secured thereto blocks 45, and these blocks 45 receive the inner ends of stub shafts 46 carried by arms 21' and 23' secured to one longitudinal top rail 21 and the intermediate rail 23. Hence, the main or primary frame is mounted for free swinging movement.

The blocks 45 also slidably support bearing plates 47 for the pulley shaft 48. The pulley shaft 48 can be adjusted back and forth toward and away from the saw frame by the tightening or loosening of a holding bolt 49. A double pulley wheel 50 is rotatably mounted on the pulley shaft 48 through the use of suitable ball or other bearings, for a purpose which will also be hereinafter more fully set forth.

The inner or secondary frame 41 includes spaced, parallel straps 51 connected together by spaced, transverse blocks 52. These blocks 52 carry outwardly extending pivot or stub shafts 53 and 54, which are arranged in longitudinal alinement. The stub shaft 54 is rotatably mounted in a bearing 55 carried by a crosspiece 56. This cross piece 56 is connected to the spaced, parallel, logitudinal bars 43 of the primary frame, and, thus, the piece 56 forms a part of said primary frame.

The forward pivot or stub shaft 53 extends rotatably into the crosspiece 44 of the primary frame, and this stub shaft has keyed or otherwise secured thereto a worm wheel 57, which has meshing therewith a worm 58. The worm 58 is formed on or secured to the adjusting shaft 59, and this shaft is provided with any preferred type of operating handle or crank wheel 60.

The stub shaft 53 also has secured thereto for movement therewith a pointer 61, which is adapted to travel over a dial plate 62, and this dial plate is rigidly fastened to the outer face of the front cross member 44 of the outer or primary saw frame. The dial plate 62 is provided with graduations 63, and the position of the pointer 61 relative to the graduations will indicate the angular position of the saw relative to the vertical.

To facilitate the reading of the dial plate, the graduations include large graduation points spaced ten degrees apart, and, hence, these large graduation points are marked "10," "20," "30," and "40." Points, each of which indicates a degree, are arranged in a cone shape between the large graduated points. Hence, each degree point can be easily read.

Extending forwardly of the outer or primary frame and rigidly secured thereto is an open guide frame box 64, which receives the traveling nut 65. This traveling nut is fastened in the box by pivot pins 66, which are received in slots 67 formed in the sides of the box. Thus, the traveling nut 65 is free for rocking movement on the box, and this nut receives an adjusting feed screw 68. The feed screw 68 is arranged in a vertical plane and is rotatably mounted in suitable bearings carried by one transverse top rail 22 and a transversely extending frame brace bar 69. The lower end of the feed screw shaft 68 has keyed or otherwise secured thereto a suitable hand wheel or operating crank handle 69'. Obviously, by turning the handle 69', the feed screw 68 will be rotated, and this will raise or lower the traveling nut 65 according to the direction of the rotation of the screw. The raising or lowering of the nut 65 will raise or lower the primary saw frame 40 and its associate mechanism, and, thus, bring about the raising and lowering of the disc saw blade 30 through the table top.

A dial plate 70 and a pointer 71 are provided for indicating the position of the saw above the table, so that the desired depth can be cut into the work. To bring about the travel of the pointer over the dial plate 70, the pointer 71 is secured to a pointer shaft 72, and this shaft has formed thereon or secured thereto a worm wheel 73, which meshes with a worm 74 keyed or otherwise affixed to the feed screw shaft 68. The dial plate 70 is rigidly fastened to the box 64, and the dial plate is provided with graduations 75, which are of the same character as the graduations utilized on the dial plate 62 for indicating the inclination of the saw. Thus, the graduations include spaced indicating marks provided with the numbers "1," "2," and "3," which indicate inches. The space between the inch marks are subdivided into eighths, and the eighths are indicated by dots. Between the quarter-inch marks, a series of dots are provided arranged in a triangular point, and the dots indicate thirty-seconds of an inch. Thus, the graduations can be easily read and the pointer can be easily set.

The saw disc blade 30 is detachably fastened to a suitable arbor 76, and the arbor also has fastened thereto a drive pulley 77. The ends of the arbor are rotatably mounted in suitable bearings 78 carried by the spaced, parallel frame bars 51 of the inner or secondary frame 41. Trained about the pulley wheel 77 is a pulley belt 79, which leads to one part of the double pulley 50. Trained about the other part of the double pulley 50 is a drive pulley belt 80, and this pulley can lead to any suitable source of power. In the present instance, the belt 80 is trained over a pulley wheel carried by the armature shaft of the motor 19. Obviously, by adjusting the position of the shaft 48 relative to the inner or secondary saw frame 41, the belt can be adjusted to take up slack and the like.

In order to bring about the effective guiding of the work and the correct gauging thereof relative to the saw blade 30, I provide a longitudinally extending gauge block 81, which is movable toward and away from the saw 30. The gauge block 81 is positioned relative to the saw, so that the desired amount of material can be cut off a piece of work.

Means is provided for accurately adjusting the longitudinally extending gauge block across the table toward and away from the saw. Hence, the forward end of the gauge block 81 is provided with a downwardly and inwardly extending foot 82, and this foot 82 slides over the top of a pair of spaced guide tracks 83. These guide tracks 83 slidably receive between the same the traveling nut 84, and this nut 84 is rigidly fastened to the foot 82. The nut 84 receives the feed screw 85, and the feed screw 85 is journaled in suitable bearings 86 carried by the frame of the machine.

The outer end of the feed screw shaft 85 has connected therewith operating handles 87, and, obviously, by turning the handles, the feed screw shaft will actuate the traveling nut 84, and this nut, in turn, will carry the longitudinally extending gauge block 81 therewith.

To accurately indicate the position of the gauge block 81 relative to the saw, a dial plate 87 and an indicating pointer 88 are provided. The dial plate 87 is rigidly secured to a gear housing 89, while the pointer 88 is rigidly fastened to a worm wheel shaft 90. This worm wheel shaft 90 has keyed or otherwise secured thereto a worm wheel 91, which meshes with a worm 92 keyed or otherwise secured to the feed screw shaft 85. Thus, during rotation of the feed screw shaft 85, the pointer 88 will travel over the dial plate 87. The dial plate 87 is provided with graduations 93, and the graduations 93 can be of the same type as shown on the previously mentioned dial plates 62 and 70.

Figure 7:
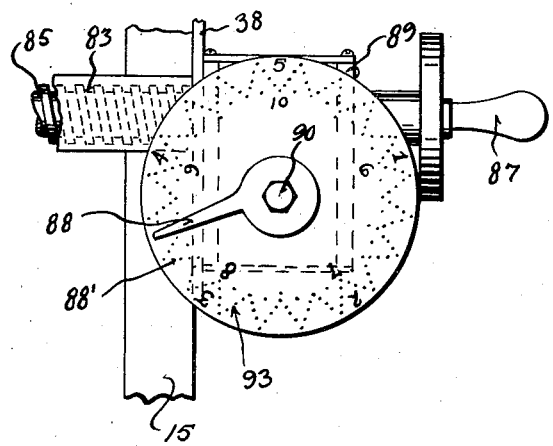
Figure 7 is a view similar to Figure 6, but showing the outer face of said operating mechanism, the view illustrating the novel type of dial plate employed for facilitating adjustment.
Figure 10:
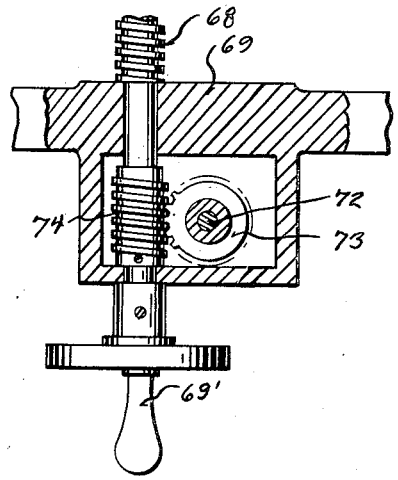
Figure 10 is a fragmentary, detail, vertical, sectional view taken on the line 10—10 of Figure 1, looking in the direction of the arrows, illustrating the mechanism for raising and lowering the saw frame and the saw blade.
Figure 11:
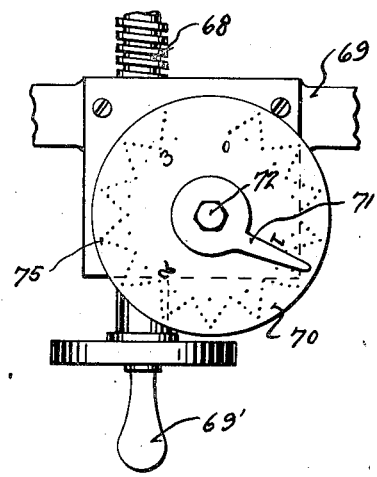
Figure 11 is a view similar to Figure 10, but showing the outer face view of the mechanism employed for raising and lowering the saw frame.
Figure 8:
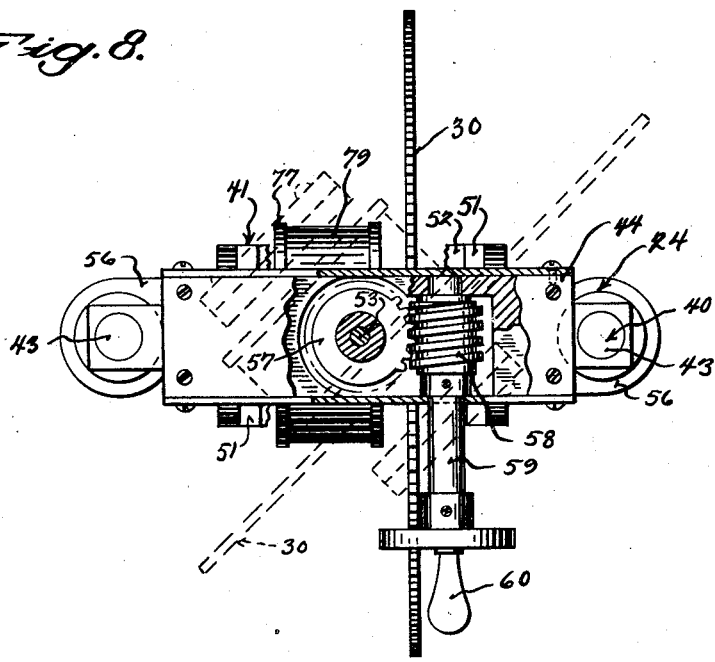
Figure 8 is a fragmentary, transverse, sectional view taken on the line 8—8 of Figure 1, looking in the direction of the arrows, illustrating a part of the mechanism for bringing about the accurate tilting of the saw blade.
Figure 9:
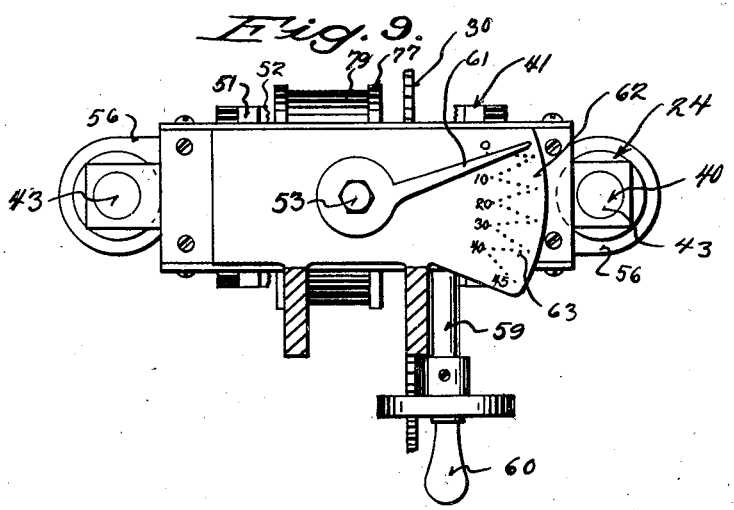
Figure 9 is a view similar to Figure 8, but taken on the line 9—9 of Figure 1, looking in the direction of the arrows, and illustrating the dial plate and pointer for indicating the angular position of the saw.

As illustrated in Figure 7, the graduations include spaced indicating marks bearing the numbers "1," "2," "3," "4," and 5," and these numbers are inch marks, and show the distance of the gauge bar 81 from the saw in inches. The distances between the inch marks is further subdivided by points into eighths and quarters, and the quarter marks are further connected by points arranged in the form of a triangle, and these points indicate thirty-seconds of an inch.

In some forms of sawing machines of a large order, the gauge bar or block 81 might be disposed further away from the saw than five inches, and, hence, the inch marks can be marked with additional numbers "6," "7," "8," "9," and "10," and it is merely necessary to continue the rotation of the screw shaft past one complete revolution of the pointer 88 in order to read the inch marks "6," "7," "8," "9," and "10."

To facilitate the movement of the work toward and away from the saw and to hold the work in any desired angular position during the feeding of the work against the saw for mitering and the like, a sliding and swinging gauge bar 94 is provided. This gauge bar 94 is mounted upon a swinging shaft 95, which is rotatably carried in suitable bearings on a gear housing 96. This gear housing 96 is slidably mounted on a guide bar 97, which extends longitudinally of the frame on one side thereof. The inner end of the swinging gauge bar 94 carries a pointer 98, which is adapted to travel over a dial plate 99, which forms a part of the gear housing 96.

The shaft 95 has formed thereon or secured thereto a worm wheel 100, which is arranged within the housing, and meshing with the worm wheel is a worm 101, which is also arranged within the housing. The worm 101 is, in turn, formed on or secured to the operating shaft 102, and this shaft is provided with suitable manual operating means, such as handles 103.

Obviously, by rotating the shaft 102, the gauge block 94 can be swung to any angular position relative to the saw and the transverse axis of the saw table.

The dial plate 99 is provided with graduations 104, and the pointer cooperates with these graduations to indicate the angular position of the gauge bar 94. The graduations 104 are of the same character as on the other dial plates previously described, and the graduations include center "0" marks 105, and when the pointer coincides with the "0" mark, the gauge block is at direct right angles to the saw blade 30 and the longitudinally extending gauge bar 81. On each side of the "0" mark, the graduations are numbered to indicate degrees, and to facilitate the reading of the degrees, the degree dots are arranged in triangular form.

As shown in Figure 4, the gauge bar 94 is set at an angle of forty-five degrees, and the work is placed against the gauge bar. The gauge bar and the work can now be slid as a unit toward the saw, and the work will then be cut on a forty-five degree angle.

From the forgoing description, it can be seen that I have provided an exceptionally simple and durable form of power-driven bench saw, in which novel mechanism has been provided for raising and lowering the saw and for tilting the saw itself to different angular positions.

Changes in details may be made without departing from the spirit or the scope of my invention, but what I claim as new is:

1. A power-driven bench saw comprising, a base, a table on the base having a slot, a disc saw movable through the slot above and below the table top, means for supporting the saw including an outer frame mounted at one end for swinging movement on the base, adjustable means supporting the other end of the outer frame for raising and lowering the frame, a secondary frame rockably mounted on the first-mentioned frame at right angles to the axis of the first-mentioned frame, a rotatable shaft in the secondary frame carrying the disc saw, means for driving said shaft, and means for tilting the secondary frame on the outer frame.

2. A power-driven bench saw comprising, a base, a saw table on said base having a slot therein, a disc saw blade mounted below said table adapted to be moved up and down through the slot, means for supporting the saw including a main frame having spaced, parallel, longitudinally extending supporting bars and transverse connecting cross bars, means rockably mounting the longitudinal bars at one end, means for raising and lowering the bars at the other end, a secondary frame arranged within the primary frame having outwardly extending stub shafts rockably mounted in the cross bars, a saw arbor on the secondary frame for the saw blade, means for rotating the arbor, and means for rocking the secondary frame including a worm wheel on one of the stub shafts, a manually operable shaft, and a worm on said manually operable shaft meshing with the worm wheel.

3. A power-driven bench saw comprising, a base, a saw table on said base having a slot therein, a disc saw blade normally disposed below the table and movable through the slot, a supporting structure for the saw blade including an outer primary frame, means rockably connecting the outer primary frame to the base at one end, an inner secondary frame rockably supported by the primary frame, a saw arbor rotatably mounted in the secondary frame for the saw blade, means for rotating said arbor, manual means for tilting the secondary frame with the saw blade, and means for raising and lowering the primary frame including a supporting box carried by the inner end of the primary frame, a traveling nut rockably carried by the box, a feed screw rotatably mounted in a vertical plane on the base fitted in the traveling nut, and manual means for turning the screw.

MARK UREMOVICH.